Patented June 10, 1941

2,245,548

UNITED STATES PATENT OFFICE 2,245,548

PROCESS OF PURIFICATION OF NAPHTHENIC ACIDS THROUGH CONVERSION TO NITRILES

Anderson W. Ralston and James Harwood, Chicago, Ill., assignors to Armour and Company, Chicago, Ill., a corporation of Illinois No Drawing. Application May 1, 1939, Serial No. 271,200

8 Claims. (Cl. 260—514)

This invention relates to processes of preparing nitriles of naphthenic acids and it comprises processes wherein the naphthenic acids, or hydrocarbon mixtures containing such acids, are reacted with ammonia gas at elevated temperatures, just below the boiling point of the reaction mixture to prepare hydrocarbon solutions of nitriles of such naphthenic acids; it further comprises processes wherein the hydrocarbon reaction mixture containing the nitriles is treated for the separation of the naphthenic acid nitriles therefrom.

Naphthenic acids are cheap and abundant materials. They occur in significant quantities in domestic crude oils particularly those obtained from the Gulf Coast fields or those from California. In certain cases the distillates from Gulf Coast crudes contain as high as one and a quarter percent of naphthenic acids and the southern California crudes from one to three percent. Crude oils from Rumania and Russia in some cases contain as high as 2.4 percent of naphthenic acids.

Naphthenic acids can be obtained from the crudes in which they occur by the use of aqueous sodium hydroxide solutions. The acids are converted by this treatment to sodium naphthenates and can be obtained by acidification of these soaps. Petroleum distillates are often acid refined with sulfuric acid and then alkali washed to remove acidic constituents. This latter treatment removes the naphthenic acids which can be recovered from the alkali washings by acidification. The presence of appreciable percentages of naphthenic acids in petroleum products is objectionable because of their corrosive action and unstability to high temperatures. The naphthenic acids are, therefore, by-products of the petroleum industry and their conversion to valuable products would be welcomed.

The naphthenic acids offer an interesting and valuable source of raw material for chemical synthesis. One objection to their large scale commercial use at the present time is the great difficulty in obtaining them in a state of purity. Since the naphthenic soaps are emulsifying agents their extraction from crude oil or distillates by alkali washing is quite difficult because of this tendency to emulsify. Alkali washings contain substantial amounts of hydrocarbons, pitches, etc., and it is extremely difficult to separate the acids from these substances. The presence of these hydrocarbons greatly interferes with the use of these acids in such products as soaps, emulsifying agents or similar products. The problem in connection with these acids, therefore, has a number of aspects chief among which are: their preparation in a state of purity with particular reference to their separation from the hydrocarbons; the preparation of valuable products from them, or their conversion to heat stable, non-corrosive compounds if their extraction from the oil is not deemed to be economically feasible.

We have now discovered that these naphthenic acids can be easily converted into naphthenic nitriles which have a number of interesting and valuable uses. We have further discovered that the naphthenic acids contained in hydrocarbon-naphthenic acid mixtures can be converted into nitriles and that these nitriles can then be separated from the hydrocarbons by several alternate methods such as by distillation or preferential adsorption upon silica gel as in the process described in Pool U. S. Patent 2,107,904 or by preferential solvents such as those described in the Ralston and Pool Patents U. S. 2,133,007, 2,145,802, 2,145,803 and 2,145,804. Such processes result in the preparation of pure naphthenic nitriles and these can be used as a starting point for the synthesis of many interesting compounds. In addition we have discovered that crude oils or distillates containing small percentages of naphthenic acids can be treated so that these acids are converted into nitriles. These nitriles can then either be removed from the oil by, say, preferential adsorption upon silica gel and recovery from the gel by steam or they can be left in the oil or the distillates to improve the polarity or oiliness of the lubricants. Nitriles have been shown by Ralston, Pool and Harwood, U. S. Patent 2,053,045, to add desirable properties to oils and by Conquest, U. S. Patent 2,135,327, to improve gasolines.

In the processes of the present invention we start with either a hydrocarbon mixture containing naphthenic acids or with crude naphthenic acids isolated from hydrocarbon oils, or with naphthenic acids in a relatively pure state, that is to say, naphthenic acids from which most of the hydrocarbons have been removed. With each of these starting materials the general process steps are substantially the same. These process steps, in essence, consist in maintaining the naphthenic acid starting material in a reaction vessel which can be heated and into which ammonia gas may be passed. The naphthenic acid starting material is heated to a temperature above 100° C. and generally just below the boiling point of the material. Ammonia gas is then passed into the hot liquid in the reaction vessel. Under these conditions the ammonia reacts with the naphthenic acids to give a final reaction product consisting of nitriles of such acids. During the reaction water is continuously volatilized and driven off from the reaction mixture. The process, in consequence, is mainly conducted in the liquid phase, that is to say, the naphthenic acids contained in the starting material are maintained in liquid phase substantially throughout the reaction. Leading from the reaction vessel we advantageously provide a conduit communicating with a water-cooled condenser to condense any volatile materials in addition to water. There may be some slight tendency for the naphthenic acid nitriles to volatilize along with low boiling hydrocarbons and water, and these we collect by the means stated.

By conducting the reaction in substantially the liquid phase and at temperatures above the boiling point of water and just below the boiling point of the naphthenic acids, water is continuously driven off from the reaction mixture. This is essential for the success of our process. It is possible that the naphthenic acids first form an amide with the ammonia which in turn breaks down to form the nitrile and water. If the water is not continuously removed from the reaction mixture yields of nitriles are not satisfactory.

We shall now give specific examples of how our invention can be practiced.

*Example 1*

We start with a mixture of crude naphthenic acids containing about 70% of naphthenic acids having an average molecular weight of 274, the rest being hydrocarbons and sludge-like materials associated with such acids in the recovery thereof from petroleum. 300 parts by weight of this crude mixture are placed in a reaction vessel and heated to a temperature above 100° C. and a few degrees below the boiling point of the mixture. This boiling point, on the average, is about 350° C. Dry ammonia gas is then passed into the mixture for a period of about one and one-half to two hours. Finally the mixture is then passed over a heated aluminum oxide catalyst in the presence of ammonia to thoroughly decompose any last traces of ammonium soaps of naphthenic acids. In the presence of the aluminum oxide, which is heated to the reaction temperature in the chamber, any small amounts of ammonium soaps are broken down to the nitriles. The final reaction product is one in which all of the naphthenic acids have been converted to nitriles associated with the hydrocarbons in the starting mixture. These nitriles can be obtained in a relatively pure state by adsorbing them on silica gel and releasing them from the gel by steam distillation. The nitriles obtained have a boiling point range of 85° to 190° C. at 3 mm. of mercury and contain about 4.5% of nitrogen.

*Example 2*

Naphthenic acids are separated from the crude starting mixture described in Example 1 and then subjected to substantially the same reaction procedure as therein described. 300 parts by weight of such purified nitriles gives a product weighing approximately 240 parts by weight containing 5.43% of nitrogen and having a boiling point range of 85° to 190° C. at 3 mm. of mercury. The average molecular weight of the nitriles is 258.

*Example 3*

A crude naphthenic acid-containing mixture having about 65% of naphthenic acids with an average molecular weight of 232 is treated as described under Example 1. The reaction product is then passed over silica gel in the liquid phase to adsorb the nitriles without adsorbing hydrocarbons associated therewith. The nitriles are then removed from the silica gel by subjecting the gel to a steam treatment and condensing the thus steam distilled nitriles. The nitriles so produced are a yellow liquid containing about 6.9% of nitrogen.

*Example 4*

500 parts by weight of a topped California crude oil containing approximately 1% of naphthenic acids is placed in the reaction vessel and ammonia passed into the oil for one hour at a temperature of about 348° C. Under these conditions the naphthenic acids present are converted to nitriles. The nitriles can be recovered from the hydrocarbon solution by direct distillation preferably under vacuum, or can be adsorbed on silica gel.

*Example 5*

A Gulf Coast gas oil containing approximately 0.75% of naphthenic acids is treated as described under Example 4. The reaction product is then passed over silica gel and a mixture of nitriles recovered therefrom having about 6.7% of nitrogen.

In addition to processes having for their object the preparation of nitriles of naphthenic acids, the present invention offers a convenient way of recovering naphthenic acids from crude oils. The naphthenic acids are, in accordance with the invention, first converted to nitriles, the nitriles separated from the reaction mixture, and then hydrolyzed to convert them back to naphthenic acids.

Having thus described our invention, what we claim is:

1. The process of preparing nitriles of naphthenic acids which comprises reacting crude naphthenic acid while in liquid phase with ammonia.

2. The process which comprises passing ammonia into a heated mixture of naphthenic acids and petroleum hydrocarbons to convert the naphthenic acids to nitriles.

3. The process which comprises passing ammonia into a heated mixture of naphthenic acid and petroleum hydrocarbons to convert the naphthenic acids to nitriles and then separating the nitriles from the petroleum hydrocarbons.

4. The process which comprises reacting a petroleum fraction containing small amounts of naphthenic acids with ammonia to convert the naphthenic acids to nitriles.

5. The process of removing naphthenic acids from petroleum fractions containing the same which includes heating the fraction to above 100° C. but below the boiling point of naphthenic acids therein, and reacting the heated fraction with ammonia to convert the naphthenic acids to nitriles.

6. The process of treating hydrocarbon oils containing naphthenic acids which comprises converting the naphthenic acids therein to their corresponding nitriles by reacting the acids with ammonia.

7. In a process of purifying naphthenic acids, the step comprising reacting crude naphthenic acids with ammonia to form naphthenic acid nitriles, and then separating the nitriles from the reaction mixture.

8. In a process of purifying naphthenic acids, the steps comprising reacting crude naphthenic acids with ammonia to form naphthenic acid nitriles, separating the nitriles from the reaction mixture, and hydrolyzing the nitriles to form purified naphthenic acids.

ANDERSON W. RALSTON.
JAMES HARWOOD.